United States Patent
Farrell et al.

(10) Patent No.: US 12,278,811 B2
(45) Date of Patent: Apr. 15, 2025

(54) SECURING IN-VEHICLE SERVICE ORIENTED ARCHITECTURE WITH MAC GENERATE ALLOW LIST

(71) Applicant: GM GLOBAL TECHNOLOGY OPERATIONS LLC, Detroit, MI (US)

(72) Inventors: Brian Farrell, Troy, MI (US); Sherif Aly, West Bloomfield, MI (US); Mohamed A. Layouni, Fraser, MI (US); Manohar Reddy Nanjundappa, Cedar Park, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 18/073,540

(22) Filed: Dec. 1, 2022

(65) Prior Publication Data
US 2024/0187401 A1 Jun. 6, 2024

(51) Int. Cl.
*G06F 21/00* (2013.01)
*H04L 9/40* (2022.01)

(52) U.S. Cl.
CPC ............ *H04L 63/083* (2013.01); *H04L 63/20* (2013.01)

(58) Field of Classification Search
CPC ....... H04L 63/083; H04L 63/20; H04L 63/08; H04L 67/12; H04L 67/52
See application file for complete search history.

(56) References Cited

U.S. PATENT DOCUMENTS

| | | | | |
|---|---|---|---|---|
| 2013/0104231 | A1* | 4/2013 | Niner | H04L 63/1416 726/23 |
| 2017/0026386 | A1* | 1/2017 | Unagami | H04L 12/40032 |
| 2018/0262466 | A1* | 9/2018 | Atad | H04L 63/0245 |
| 2019/0104149 | A1* | 4/2019 | Zeng | H04L 9/12 |
| 2020/0029209 | A1* | 1/2020 | Nölscher | H04W 12/069 |
| 2021/0160315 | A1* | 5/2021 | Linn-Moran | H04L 12/40 |
| 2022/0131842 | A1* | 4/2022 | Zhang | G06F 21/57 |
| 2022/0263709 | A1* | 8/2022 | Hirano | H04L 43/026 |
| 2023/0353656 | A1* | 11/2023 | Kishikawa | H04L 63/1425 |

OTHER PUBLICATIONS

Securing SOME/IP for In-Vehicle Service Protection, IEEE Transactions on Vehicular Technology, vol. 69, No. 11, Nov. 2020; Iorio et al.*

* cited by examiner

Primary Examiner — William A Corum, Jr.
(74) Attorney, Agent, or Firm — Quinn IP Law (57) ABSTRACT

An electronic control unit (ECU), or node, is configured to use a single key for generating requests from a security peripheral for a MAC. The security peripheral includes the stored shared key. The security peripheral may further include a policy enabling it to detect if a request from the V-ECU is valid, in which case it generates a MAC. The security peripheral is also used to store information in a MAC Generate Allow List (MGAL). In some embodiments, the receiving nodes in a network receive data based on a security peripheral's response to a transmit nodes requests for a MAC. The receiving nodes use this knowledge to avoid being spoofed.

20 Claims, 3 Drawing Sheets

SECURING IN-VEHICLE SERVICE ORIENTED ARCHITECTURE WITH MAC GENERATE ALLOW LIST

INTRODUCTION

Modern vehicles have seen technological advancements in the amount of electronics and software relevant to both performance and luxury criteria. Electronic Control Units (ECUs), for example, are used in greater numbers as embedded systems within the vehicle that control different electromechanical systems. Modern vehicles include different ECUs for controlling a host of different vehicle systems from engine control to entertainment devices.

Vehicle Service Oriented Architecture ("SOA") has enhanced the progression of ECU technology in vehicles by reframing much of the copious code in the 100+ ECUs in modern vehicles to more defined middleware. SOA incorporates certain components to act as middleware between applications or services on one hand, and the vehicle operating system on the other hand. Middleware helps uncouple the various software components from the vehicle hardware, resulting in greater software portability and a simpler development process. Like in computer fields, SOA hides more abstract layers and makes it easier for multiple third parties to port software applications to different portions of the ECU network.

Vehicle SOA has shortcomings. The flexibility gained via an SOA in an "in-vehicle network" can translate to more third party malicious code attempting to spoof other nodes into taking actions with undesirable consequences. Since the network sits with a heavy, high speed backbone, consequences of these attacks can range from inconvenient to catastrophic.

SUMMARY

In one aspect of the disclosure, a system includes a host. The host includes a processor coupled to a memory. The host further includes a security peripheral. The security peripheral includes a dedicated key used by the node for requesting generation of a message authentication code (MAC). The security peripheral is configured to generate a MAC responsive to a policy in a MAC Generate Allow List. The security peripheral is further configured to not generate the MAC if the message is not allowed to be sent by the node.

The system further includes a plurality of receivers. Each receiver is configured to receive messages from the node; each receiver configured to obtain knowledge regarding the relative trustworthiness of the node based at least in part on a type of service to be sent for authentication. Relocation or movement of the host and receivers to a geographically remote location relies on a relative trustworthiness of the host without making substantive changes to the receivers.

In another aspect of the disclosure, a node includes a processor coupled to a memory. The node further includes a security peripheral, and at least one key stored in the security peripheral of the node. MAC authenticate requests to the security peripheral from a receiving node are received with the same key to authenticate messages from the transmitting node in a way that prohibits the key used for transmission from being used to generate MACs.

In still another embodiment of the disclosure, an in-vehicle network includes an electronic control unit (ECU) comprising a security peripheral, the security peripheral comprising a MAC generate allow list (MGAL). The network also includes a processor configured to use a shared secret key to generate MACs from the security peripheral. The network further includes a plurality of receivers configured to receive updates relative to permissions or denials of the security peripheral to MAC generation requests, wherein the network elements can be relocated without software upgrades.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes the various combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, explain the principles of the disclosure.

The appended drawings are not necessarily to scale and may present a simplified representation of various features of the present disclosure as disclosed herein, including, for example, specific dimensions, orientations, locations, shapes and scale. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." For example, "optimal vehicle routes" may include one or more optimal vehicle routes. Moreover, words of approximation such as "about," "almost," "substantially," "generally," "approximately," etc., may be used herein in the sense of "at, near, or nearly at," or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The principles of the present disclosure are directed to vehicle networks and nodes, and their particular susceptibility to spoofing and other malicious software attacks when the vehicle is implemented in a SOA-based network environment. According to certain aspects, this vulnerability can be addressed, and the problem solved, by using a security peripheral to generate for each of the transmitting nodes a message authentication code (MAC) over the message to be sent. The security peripheral may first check an authenticated policy identified in a MAC Generate Allow List (MGAL) data repository to determine if the particular message to be sent is authorized to be transmitted by the subject node. The receiving nodes may also reject the message if it lacks a valid MAC. Consequently, the exacting transmission procedures make the principles of SOA with service discovery in networks feasible while preventing vehicle nodes, messages or services from being spoofed or otherwise sustaining harmful consequences resulting from attacks while within an in-vehicle network.

An ECU ("Electronic Control Unit") is a device in a vehicle that controls one or more vehicle electrical systems. The ECU instructs the vehicle how to operate. In most cases, the core of an ECU is one or more processors that execute instructions of embedded software. A V-ECU is a software model of target ECU hardware that may assist in performing ECU functions and simulations, but that may be implemented purely in software, such as on the microprocessor of an ECU. V-ECUs advantageously enable vehicle functions to be tested using microcontrollers in laboratories before the functions are deployed in the vehicles to be sold, for example. Each instance of the V-ECU can be simply deployed with the test solution, after which the functionality may be thoroughly tested. For sophisticated ECUs, V-ECUs may be used as independent entities within the system to perform authorized tasks.

The principles of the present disclosure are directed to rendering security procedures more compact and efficient in entities like network nodes (e.g., electronic control units or ECUs) of a vehicle. The overall number of objects and instructions may be reduced within a node without reducing—and in some cases increasing—the effectiveness of the high security techniques within a node. Because these software-equipped ECUs control functions including braking, acceleration, and the like, maintaining adequate security in these instances is paramount.

At the same time, while these ECU-based systems did much to increase efficiency, useability, occupant comfort, driver assistance, safety and lower costs, previous lines of vehicles dependent on ECU and/or node-based technologies were difficult to upgrade in a cost-effective manner. For one, vehicles have traditionally suffered from the lack of a viable software platform that abstracted hardware layers, which would make it otherwise easier for developers to write code to specific vehicle types. Instead, many of the ECUs had software written down to very low layers including the physical layer or equivalent thereof. Equally, the lack of a tangible platform across software could be developed also was a hindrance to dramatic developments in the field of in-vehicle networks, in which case different ECUs could communicate effectively with one another, and vehicle networking in general, both in part because the different vehicle brands relied on software at disparate levels and the industry lacked a standard platform for effectively developing widely berthed network software.

In apparent recognition of at least some of these issues, a service oriented architecture for the automotive industry has recently become popular. To tend to safety demands and facilitate the exchange of critical information, vehicles became a natural candidate for the technology. Service-oriented architectures operate from a communications perspective on an "on demand" basis." For example, a sender of data transmits information only where it is known that at least one listener in the network needs the data. At the outset, this architecture avoids participating in the unnecessary jabber that occupied the airwaves, and hence needlessly jammed the relevant network.

Originally, the evolution of vehicles took a data intensive approach in which the vehicle's man sensors produced voluminous data, which in turn was transmitted to different nodes in the vehicle. Sensor data was sent blindly between entities, for instance, regardless of whether it had changed. Data was also sent from the viewpoint of the sending device. That is to say, provided the sender concluded the data was at least marginally important, it was sent, regardless of whether listeners were present on the network.

By contrast, in more recently developed service oriented architectures, a more basic approach is adopted. The sender transmits data when at least one receiver currently on the network needs it. SOA relies heavily on the presence of middleware. With known middleware in circulation and used in SOAs, developers can concentrate on scalable architectures to design SOA software for vehicles. Scalable service-oriented middleware over IP is responsible for the acronym SOME/IP. Another popular open source middleware is AUTomotive Open System Architecture (AUTOSAR), which includes a consortium of worldwide automobile manufacturers as members.

Third-party applications may be installed in the vehicle and used in conjunction with various ECUs. It is important to ensure that such applications are not able to thwart existing security protocols and spoof, for example, the node(s) required for braking in order to prevent a braking action by the driver. This is one of many examples of why security in these network nodes is important. ECUs may range from controlling the engine to the airbags to the brakes, and many other systems. An ECU may often receive inputs including information about whether to perform a certain task, and after performing some relevant computations using the input, the ECU may output data intended for an actuator to allow the actuator to perform some action based on a defined set of parameters.

ECUs may be configured to include the unmodified production code. As ECUs increase in the number and scope of quality of service (QOS) specifications along with the vehicle's increase in functionality, so too may the system's security requirements. System security refers in this case to the fact that the dozens of ECUs often present in a vehicle perform separate but critical functions, such as acceleration, ignition and braking, to name a few. System security means in this context that instructions to engage brakes should not be inadvertently or nefariously sent to an acceleration module to accelerate the vehicle, lest potentially catastrophic consequences may result. In short, a large number of events should be properly monitored as part of system security to ensure that instructions are issued only from an entity properly authorized to send the instruction, and that the scope of the instruction is proportionate to the authority of the issuing entity.

Existing solutions are relegated to assigning each V-ECU its own transmit key to prevent spoofing when generating messages, where spoofing in this context includes imitating another entity to convince the recipient of the message that the V-ECU is permitted to transmit the subject message. The subject message is to perform some action that the spoofing entity is not entitled to perform, whether innocuous to downright dangerous. A competing consideration is that vehicles are growing, sometimes exponentially, in their technological capabilities. As such, an increasing number of tasks may be automated. In the case of an ECU, the number of entities, or V-ECUs, within a single ECU is increasing. A competing consideration is that vehicles continue to become more technologically sophisticated. One result of these trends is that the number of V-ECUs within a single ECU is increasing.

In spite of these limitations, these ECU designs as noted are ordinarily intended to include one secret key for each V-ECU, in order to ensure that the V-ECUs cannot spoof each other in operation. Existing designs may also include some type of "crypto-engine" built into an example four V-ECU network host. At the outset prior to beginning of operations, this crypto engine may be populated with information or otherwise appropriately configured via hardware such that the crypto-engine knows which V-ECU is making the request of the four ECUs, since the crypto engine knows the key for each V-ECU. The crypto engine in this implementation is acting analogous to law enforcement, because if V-ECU 2 is trying to make a request to generate a message authentication code ("MAC") for a message using the key belonging to the V-ECU3, rather than its own key, then the Crypto Engine will know in advance that the wrong key is being used by V-ECU-2. As such, the Crypto Engine is not going to let the V-ECU 2 perform generate the MAC to perform the instruction it is not otherwise permitted to form. The request is therefore denied.

Further up until recently, in-vehicle networks used a static configuration in which there was little or no need to activate mobile sensors or nodes. As such, in those case it is easy to know what nodes will need which messages. In this static configuration, most exchanges of data were known in advance, except for system updates. Even in the latter situation, however, the updates were typically directed at both the transmit and receive circuits.

Figure 1:
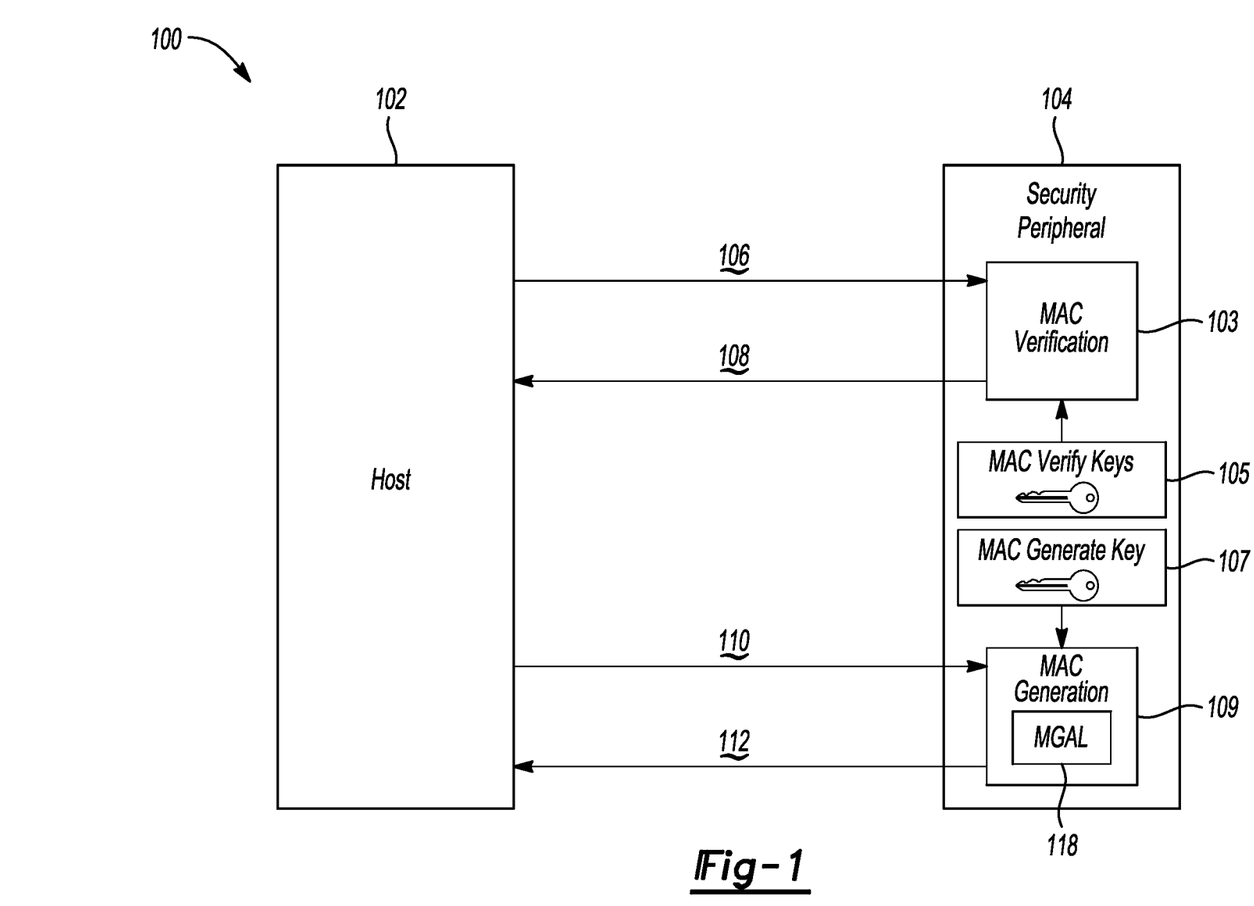
FIG. 1 is a conceptual diagram of a service oriented architecture in vehicles such that content from one or more publishers may be used when different entities are moved around.

FIG. 1 is a conceptual diagram of a service oriented architecture 100 in vehicles such that content from one or more publishers may be used when different entities are moved around. The concept of service oriented architecture may include publishers of information and subscribers. The vehicle user or occupant may elect to subscribe to some service, but the provider of the information and the publisher may move around over time. This means that the vehicle's owner or the driver may need to wait until a new provider is available. Accordingly, with this background, the concept of the service oriented architecture may provide the need to move things around and thus provides the vehicles with the discretion to make spoofing and other negative measures for difficult for ECUs.

The concept of service oriented architecture may include publishers of information and subscribers. The vehicle user or occupant may elect to subscribe to some service, but the provider of the information and the ECU's position may change over time. Accordingly, with this background, the concept of the service oriented architecture may provide a need to move things around and thus provides the vehicles with the discretion to do so. In today's static configuration, it is easier to prevent spoofing. Thus, if a first ECU tries to send a second ECU a message in an attempt to spoof a third ECU, the second ECU is statically positioned and is likely to be familiar with the first and third ECUs' information. That makes it easier for the second ECU to recognize and reject the spoofing attempt. The system recognizes spoofing attempts in that it can also tie a key to particular entity.

Conversely, in a system where entities move around a lot and they become more dynamic rather than static, as is an increasing trend, it may behoove the entities to place less emphasis on the identity of the suppliers, which may also change with frequency as a function of movement of these entities within the vehicle. Where the entities in fact become dynamic, it the service providers may not attempt to follow the random pattern of ECU movement, especially as this trend continues to increase with vehicles.

In one aspect of the present disclosure, spoofing by other nodes may be prevented by using the security peripheral 127 in conjunction with the MGAL 118 to restrict what message types this host 102 and other nodes in the network can have a MAC generated for them. This information is potentially germane to the level of trustworthiness of the node and whether it may attempt to spoof other nodes.

Referring to FIG. 1, a portion of elements in an in-vehicle network 100 is shown. A host 102 may include an ECU, a microprocessor within an ECU or another entity positioned in the vehicle for performing whatever relevant tasks are needed under the circumstances. If the host is an ECU, it may execute most or all of the application software for that ECU as well. In addition, node 102 may include software components such as the communications stack—namely, the software for communicating with other nodes. The host in FIG. 1 is shown coupled to a security peripheral 104. Security peripheral 104 may include a MAC verification device 103, and a MAC Generation device 109. As shown, the MAC verification module 103 has access to the MAC Verify key(s) 105 while the MAC Generation device 109 has access to the MAC Generate key(s) 107. The MAC verify and generate keys are securely stored, and in some embodiments are stored with the MAC Verify module 103 and/or the MAC generation module 109. Security peripheral 11 includes a relatively small amount of executable code for performing security-critical functions: generating security messages, managing keys, and the like.

The MAC Generate module 109 is used in conjunction with the MAC Generate Allow List (MGAL) 118 when the host 102 sends a request to generate a MAC for use over a secure message that the host 102 wants to send to a target ECU (node) or a virtual-ECU (within a node). The latter is a software-based ECU solution that, when active, tends to reduce the cost of the overall network nodes without losing its capabilities. The host 102 may initiate the process by sending a MAC-generation request over bus 110 to module 109. The information sent over the bus may also include criteria like the message identifier (which in this configuration is known as SecOCDataID), the KeySlotNum, and other security-related information elements. The host 102 may also include the MAC data, which may include the type of service, type of data transmitted, etc. The MAC generation box at 109 may review the relevant contents of the MGAL 118 and determine based on the MAC ID whether a MAC for the host 102 can be generated based on the host's prior history and related factors. For example, the MAC generation box 109 may further check the historical records of the MGAL 118 (in embodiments where they are available), which lists the MAC IDs. In other configurations, the MGAL promulgate one or more policies about which nodes/ECUs were previously permitted to send which messages to what modules related to what subject matter. In the former embodiment, if the MAC ID is not listed in the MGAL, the MAC generation box 109 will be unable to generate the MAC and will return an error. If the MGAL's information shows that that the message is authentic and the host 102 is above board, the MAC generation box may retrieve a key from repository 107, may generate a MAC, and may send it back to the host via bus 112. As noted, the receiving nodes may be made aware of the generation of the MAC (or lack thereof) for this device. Using this and similar background information, the receiving nodes may eventually learn which devices can and cannot be trusted, relative to which MAC IDs or in general.

The MAC verification module 103 may instead be used when the host 102 has received a message from a distinct node in the network. To verify the authenticity of the MAC, the host 102 may take the received MAC and send the MAC Verify data and factors similar or identical to the factors listed above with reference to bus 110, to the MAC verification module over bus 106. If the MAC verification module 103 determines that the MAC represents a spoof, it does not return the MAC, and the host 102 may reject the request. Otherwise, MAC verification module 103 may send the MAC back to the Host 102 over bus 108. In determining whether the MAC was derived from an authentic key, the MAC verification module 103 may use the MAC verify keys from key repository 105 to make the comparison.

As noted above, the receiving nodes of a message need not be focused on the specific identity of the entities sending them messages, provided they are trusted nodes. This makes the overall process of moving nodes more convenient and much easier. At the same time, the sending nodes remain subject to the protections afforded them via the MGAL and security peripheral 104, part of which is shown in FIG. 1. The system can ensure that a node cannot send messages or data it is not authorized to send based on the contents of the security peripheral. From the receive side, the service can be moved without having to rename the moved nodes or reconfigure the policies, since in the above examples, the trustworthiness of the senders is based on whether their requested MAC ID or service ID was present on the MGAL list. Thus, the nodes can be moved to a new location without losing any of their effectiveness. One qualifier is with respect to a new node that may be put together with the existing nodes in the new location. That new node may not have any information that the other nodes have about the transmitting nodes. For example, the new node may be a transmit-capable node with various capabilities. With brief reference to FIG. 3, security peripheral 111 is and its associated MGAL 113, assumed to be from the prior location, can simply be given a firmware update 115 to program the message, MAC, and/or service identifiers of the new node onto the relevant lists within the security peripheral 111 and MGAL 113. That way, when the new node makes a MAG generate request, if the request is valid, the MAC ID will already be in the MGAL 113 at the new location with the rest of the MAC IDs from when this security peripheral 111 was at its old location. The MGAL 113 within the transmitting node is therefore able to be updated via a secure firmware or calibration update that does not require the receiving nodes to be updated.

In short, using the principles of the disclosure enables the network elements to be moved to a different physical location without compromising the effectiveness of the network to prevent against spoofing attacks and other malicious forms of hacking by maintaining the information in the transmit modules. Thus, a vehicle operator or other individual can enjoy all the services offered by the same network in a different geographic location, such that only the transmit node needs to be updated. All of the information in the dozens or hundreds of receive nodes can be left alone and the operator can still offer and exchange all the usual services merely by adding information to a few new transmit nodes, and without loading any data into the many receiving devices in the vehicle.

(1) Shared secret keys are established in nodes (e.g., ECUs) and stored in the security peripheral of nodes in such a way that each node has a dedicated key used for transmission and the receiving nodes store the same key to authenticate messages from transmitting nodes in their security peripheral in a way that prohibits the key from being used to generate MACs. When the transmitting node needs to send a protected message with a MAC it requests the security peripheral to generate the MAC and the security peripheral will use the MGAL to check if the message is allowed to be sent by the node. If the MGAL indicates the message is not permitted to be sent the security peripheral does not provide the MAC. (2) The security peripheral will use an MGAL based on bit masks to choose which nodes the entry applies to for non-service discovery messages. (3) The table used to build the MGAL configuration for each node will be based on security peripheral key slot number and key use flags and be organized in a way that enables an entry to be directly accessed with a pointer, rather than using a lower performance search algorithm (4) The security peripheral will use the config option field at the beginning of the options section in the service discovery (SD) header to determine if SD messages should be allowed to be sent based on the entries in the MGAL. (5) If multiple cores are used and have different access rights, the MGAL is structured in sections for each core as a sorted list of pairs to make it easier to process. (6) When the protected message is transmitted by a node it will include a key serial number (KSN) in SOME/IP packets to convey Key IDs while minimizing the change required in the communication stack to process new packets (7) SOA Message IDs are decoupled from security peripheral Key Slot IDs to allow for dynamic discovery of services and use of correct key material at runtime (8) If a transmitting node needs to be able to offer a new service the MGAL is updated via signed calibration or firmware update that is authenticated by the security peripheral before use FIGS. 2A-C disclose timing diagrams showing example transmit messages from an ECU in an in-vehicle network. More specifically, in the examples shown, different messages are shown timed relative to one another using different segments. Each of FIGS. 2A, 2B and 2C involves transmitting information via different texture maps in connection with four messages/message segments. As noted, any trusted node in the network, e.g., in a new geographical location may still send its message and a receiver can still authenticate its MAC based on factors like the historical observations from the security peripheral. The transmit nodes, however, may have their own keys. For the receiving nodes to know which key to use, the transmit nodes include a key serial number (KSN) 210 in their messages. KSNs 210 are linked to keys stored in the security peripheral of the receive nodes to enable the receive nodes to know which keys to use to authenticate the received MACs with. The KSN is also linked to the particular transmit node and will change if the nodes are moved to a new location in which a new key is required.

Figures 2A, 2B, 2C:
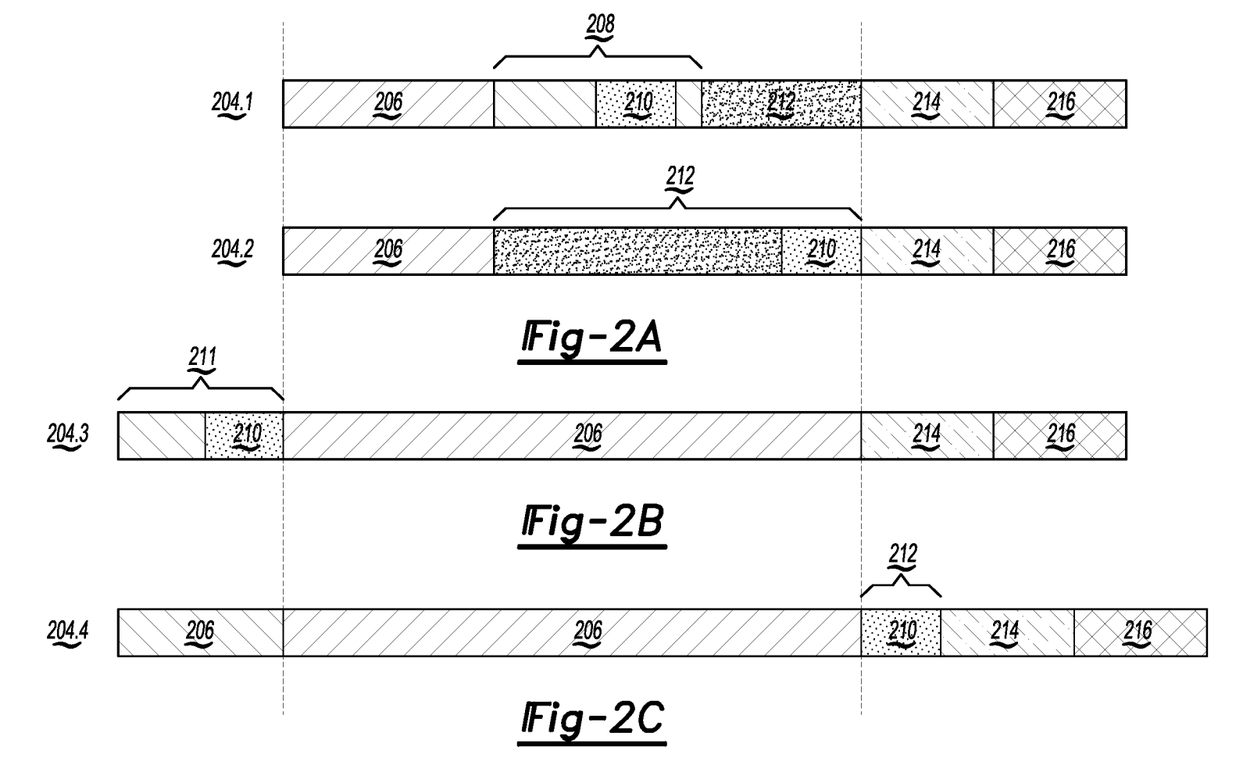
FIGS. 2A-C are timing diagrams showing example transmit messages from an ECU in an in-vehicle network.

For example, the message 204.1 represents a service-discovery ("SD") message that includes SOME and IP combined headers 206, which are the transport protcols for the SOME and IP headers, followed by the SD header 208. The SD header includes header information relevant to the type of SD request as well as the KSN 210 embedded in the SD header 208 which provides, as noted, a link to the transmit key to use, which in turn implicitly identifies the node from where the message was transmitted. Following the SD header 208 is a data payload 212 (not necessarily drawn to scale). Following the payload is the FV value 214 of "freshness value" describing the relative freshness of the data 214, the FV is finally followed by the message authentication code 216.

Message 204.2 covers non service-discovery traffic that has the SOME/IP HDR 206 followed by the SOME/IP payload, at the end of which the KSN 210 is placed, followed by KV 214 and MAC 216. Thereafter, message 204.3, used for both service discovery and non-service discovery traffic, includes an optional secured protocol data unit (PDU) header 211 with the KSN near the beginning of the message, followed by SOME/IP PACKET 206 which is not just the header but also the data payload, followed again by FV 214 and MAC 216. Message 204.4, which is used for both types of service discovery and non-service discovery traffic, begins with secured PDU header, also denoted 206 for simplicity, SOME/IP PACKET (not mere header) 206, followed by KSN 210, FV 214 and MAC 216. It should be noted that, while each message can be used for purposes of the present disclosure, message 204.4 allows the user to review the SOME/IP PACKET in its entirety even if the KSN 210 is not relevant, such that after the payload 306 in message 204.4 is an ideal place for the KSN value. In other configurations, an equally suitable location for KSN 210 in message 204.4 is between the FV 214 and MAC 216 segments, or at the end, following the MAC segments. All three of these iterations of message 204.4 enable the receiver of the message to review the payload in its entirety, and without cutting off the payload as is present in messages 204.1 and 204.2.

SD relates to a discovery phase relating to traffic the identifies the two individuals communicate over the ethernet prior to the actual communication phase to confirm that the two nodes are relevant. In the non-SD phase, the MGAL has different entries for SD and non-SD data. Because SD data has all the services available to that node, it is broadcast to the receiving node. Thus, the MGAL has a list for all SD data on one hand, versus non-SD on the other. The message ID is consulted to ensure that the peripheral can easily identify which SD message types are being transmitted to determine if it is allowed.

Figure 3:
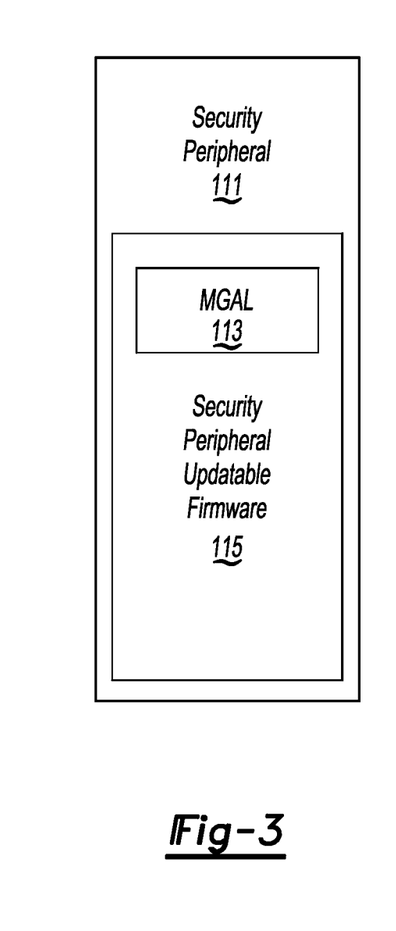
FIG. 3 is a block diagram of a security peripheral of a new transmitting node in which the MGAL receives a secure adjustable update after being added to the network.

FIG. 3 is a block diagram of a security peripheral of a new transmitting node in which the MGAL receives a secure adjustable update after being added to the network. As noted above, receiving nodes do not require any adjustment after components of an in-vehicle network are moved. MGAL 113 and/or security peripheral 111, however, ordinarily receive a secure peripheral firmware update 115 to include in its MGAL 113 the identities of those nodes authorized to perform specific services or actions. These small updates stand in contrast with the numerous updates that can be avoided with the large number of receiving nodes. Thus, the nodes in the network maintain their trusted status even when relocated, with minimal software intervention directed at one or a few nodes.

Shared secret keys are established in nodes (e.g., ECUs) and stored in the security peripheral of nodes in such a way that each node has a dedicated key used for transmission and the receiving nodes store the same key to authenticate messages from transmitting nodes in their security peripheral in a way that prohibits the key from being used to generate MACs. When the transmitting node needs to send a protected message with a MAC it requests the security peripheral to generate the MAC and the security peripheral will use the MGAL to check if the message is allowed to be sent by the node. If the MGAL indicates the message is not permitted to be sent the security peripheral does not provide the MAC. The security peripheral will may use an MGAL based on bit masks to choose which nodes the entry applies to for non-service discovery messages.

The table used to build the MGAL configuration for each node will be based on security peripheral key slot number and key use flags and be organized in a way that enables an entry to be directly accessed with a pointer, rather than using a lower performance search algorithm. The security peripheral will use the config option field at the beginning of the options section in the service discovery (SD) header to determine if SD messages should be allowed to be sent based on the entries in the MGAL.

If multiple cores are used and have different access rights, the MGAL is structured in sections for each core as a sorted list of pairs to make it easier to process. When the protected message is transmitted by a node it will include a key serial number (KSN) in SOME/IP packets to convey Key IDs while minimizing the change required in the communication stack to process new packets. SOA Message IDs are decoupled from security peripheral Key Slot IDs to allow for dynamic discovery of services and use of correct key material at runtime. If a transmitting node needs to be able to offer a new service, the MGAL is updated via signed calibration or firmware update that is authenticated by the security peripheral before use.

Figure 4:
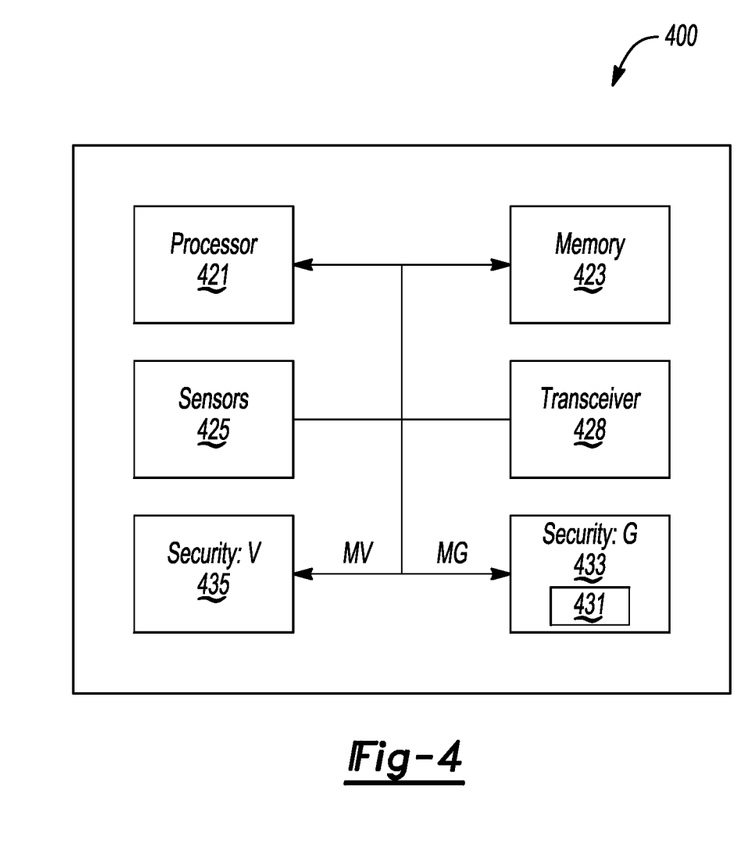
FIG. 4 is a block diagram of a node, including an ECU, to which the principles of the present disclosure can be practiced.

FIG. 4 is a block diagram of a node 400, including an ECU, to which the principles of the present disclosure can be practiced. FIG. 4 may be a transmitting node such as an ECU, or a receiving node. In some embodiments, such as in a security peripheral, not all elements of the structure shown in FIG. 4 are needed. Node 400 may include a processor 421, which in practice may include one or more processors, general purpose processors, RISC (reduced instruction set computer) processors, digital signal processors (DSP), or any processing device that can implement functions and/or instructions purely in software, partially in software, or in a mix of hardware and software. Processor is coupled to memory 423, which may be dynamic random access memory (DRAM), static random access memory (SRAM); non-volatile memory, a magnetic disc drive, a solid state drive, other non-volatile memory, cache memory, or some combination of any type of memory, including those above. Receiving nodes may also include one or more sensors 421 for making measurements in vehicles and reporting the results, for example. To this end, such receiving nodes may widely cover a variety of sensor types and may in some cases be used in ECUs and transmitting nodes.

Node 400 may also include a transceiver 428 for sending and receiving messages to other nodes in the network through any compatible vehicle wireless medium. As noted, some ECUs have keys for generating or verifying MACs. To avoid unduly obscuring the scope of the disclosure, both are shown here as examples. A security peripheral 433 for MAC generation and an accompanying MGAL may be found within or coupled to host nodes as part of an ECU. Separately element 435 is a module for MAC verification. In some configurations, including security peripherals, both modules 435 and 433 may be found in a single security peripheral. n other configurations, they are partitioned into different elements.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented herein.

What is claimed is:

1. A system comprising:
a host;
a security peripheral, wherein:
  the security peripheral includes a generation module, a verification module, a generation allow list, a transceiver, and a processor coupled to a memory;
  the memory is operational to store a plurality of verification keys and a plurality of generation keys;
  the plurality of generation keys includes a dedicated key used by the host to request generation of a first message authentication code;
  the security peripheral is operational to determine if the host is permitted to transmit a first message in response to a transmit request and a first key serial number;
  the first key serial number identifies the dedicated key of the plurality of generation keys;
  the generation module is operational to generate the first message authentication code based on (i) the dedicated key and (ii) a policy in the generation allow list, and not generate the first message authentication code if a message identifier of the host is not in the generation allow list;
  the transceiver is operational to transmit to a particular receiver the first message authentication code and the first key serial number in the first message;
  the transceiver is further operational to receive from a distinct host a second message that includes a second message authentication code and a second key serial number;
  the security peripheral is further operational to determine if the host is permitted to accept the second message;
  the second key serial number identifies a second particular one of the plurality of verification keys; and
  the verification module is operational to verify that the second message is acceptable based on the second message authentication code and the second particular verification key; and
a plurality of receivers, wherein:
  each receiver is operational to receive a plurality of messages from the host;
  the particular receiver of the plurality of receivers is operational to receive the first message from the host;
  the particular receiver is further operational to obtain knowledge regarding a relative trustworthiness of the host based at least in part on a type of service to be sent for authentication; and
  relocation or movement of one or more among the host and the plurality of receivers to a geographically different location relies on a relative trustworthiness of the host without making substantive changes to the plurality of receivers.

2. A node comprising:
a processor coupled to a memory, wherein the memory is operational to store a plurality of verification keys and a plurality of generation keys;
a security peripheral that includes a generation module and a verification module; and
a transceiver, wherein:
  the security peripheral is operational to determine if the node is permitted to transmit a first message in response to a transmit request and a first key serial number;
  the first key serial number identifies a first particular one of the plurality of generation keys;
  the generation module is operational to generate a first message authentication code based on the first particular generation key where the node is permitted to transmit the first message;
  the transceiver is operational to transmit to a target node the first message authentication code and the first key serial number in the first message;
  the transceiver is further operational to receive from a distinct node a second message that includes a second message authentication code and a second key serial number;
  the security peripheral is further operational to determine if the node is permitted to accept the second message;
  the second key serial number identifies a second particular one of the plurality of verification keys; and
  the verification module is operational to verify that the second message is acceptable based on the second message authentication code and the second particular verification key.

3. The node of claim 2, wherein:
the security peripheral includes a generation allow list that contains information which determines if the generation module is permitted to generate the first message authentication code.

4. The node of claim 3, wherein:
a table used to build the generation allow list is based on a plurality of security peripheral key serial numbers and a plurality of key use flags.

5. The node of claim 4, wherein:
the first key serial number acts as a pointer into the generation allow list to access the first particular generation key.

6. The node of claim 5, wherein:
the first key serial number in the first message transmitted by the node is suitable for the target node to verify that the first message is acceptable.

7. The node of claim 6, wherein:
the first key serial number is positioned after a payload packet in the first message.

8. The node of claim 3, wherein;
when offering a new service, the generation allow list is operational to be updated via a signed calibration or firmware update authenticated prior to use.

9. An in-vehicle network comprising:
a bus; and
a plurality of electronic control units couped to the bus, wherein:
  each particular one of the plurality of electronic control units includes a security peripheral, a processor coupled to a memory, and a transceiver coupled to the bus:
  the memory is operational to store a plurality of verification keys and a plurality of generation keys;
  the security peripheral includes a generation module and a verification module;
  the security peripheral is operational to determine if the particular electronic control unit is permitted to transmit a first message in response to a transmit request and a first key serial number;
  the first key serial number identifies a first particular one of the plurality of generation keys;
  the generation module is operational to generate a first message authentication code based on the first particular generation key where the particular electronic control unit is permitted to transmit the first message;
  the transceiver is operational to transmit via the bus to a target electronic control unit of the plurality of electronic control units the first message authentication code and the first key serial number in the first message;
  the transceiver is further operational to receive via the bus from a distinct electronic control unit of the plurality of electronic control units a second message that includes a second message authentication code and a second key serial number;
  the security peripheral is further operational to determine if the particular electronic control unit is permitted to accept the second message;
  the second key serial number identifies a second particular one of the plurality of verification keys;
  the verification module is operational to verify that the second message is acceptable based on the second message authentication code and the second particular verification key; and
  one or more of the plurality of electronic control units is relocatable within the in-vehicle network without software upgrades.

10. The in-vehicle network of claim 9, wherein:
a newly positioned transmit node in the in-vehicle network is operational to receive a secure firmware update to authenticate another security peripheral prior to use.

11. The in-vehicle network of claim 9, wherein:
the security peripheral is operational to use a generation allow list based on a plurality of bit masks to choose nodes in the in-vehicle network to which a plurality of entries in the generation allow list apply for non-service discovery messages.

12. The in-vehicle network of claim 9, wherein:
a transmit message generated by each of the plurality of electronic control units includes a key serial number after a payload.

13. The node of claim 2, wherein:
the target node is operational to determine a local verification key based on the first key serial number received in the first message;
the local verification key matches the first particular generation key; and
the first message is verified based on the local verification key.

14. The node of claim 3, wherein:
the generation allow list includes a plurality of historical records of what the node is allowed to transmit.

15. The node of claim 3, wherein:
the generation allow list includes one or more policies that determine if the node is permitted to transmit the first message.

16. The node of claim 15, wherein:
the one or more policies determine if the target node is allowed to receive the first message.

17. The node of claim 15, wherein:
the one or more policies determine what subject matter the node is permitted to transmit.

18. The node of claim 17, wherein:
the transmit request includes one or more security-related information elements.

19. The node of claim 18, wherein:
the transmit request further includes a type of service being requested.

20. The node of claim 19, wherein:
the transmit request further includes a type of data to be transmitted.

* * * * *